United States Patent [19]

Schiro

[11] 3,978,235

[45] Aug. 31, 1976

[54] PRESERVATIVE PROCESS FOR PRODUCE USING A COMPOSITION COMPRISING SODIUM HYPOCHLORITE AND ALKALI EARTH METAL PHOSPHATES AND COMPOSITION

[75] Inventor: Phillip Schiro, Tampa, Fla.

[73] Assignee: Joe Jess Estrada, Castroville, Calif.

[22] Filed: May 20, 1974

[21] Appl. No.: 471,648

Related U.S. Application Data

[63] Continuation-in-part of Ser. No. 355,939, April 30, 1973, abandoned, which is a continuation-in-part of Ser. No. 93,843, Nov. 30, 1970, abandoned.

[52] U.S. Cl. .............................. 426/335; 426/418; 426/455; 426/456; 424/149
[51] Int. Cl.$^2$ ........................................... A21D 4/00
[58] Field of Search .......................... 426/253–255, 426/318, 262, 270, 286, 302, 303, 308, 310, 321, 331, 333, 335, 348, 377, 532, 539, 418, 419, 455, 456, 506, 524; 252/186; 424/127, 128, 149

[56] References Cited
UNITED STATES PATENTS

| | | | |
|---|---|---|---|
| 2,071,091 | 2/1937 | Taylor | 424/149 |
| 2,082,573 | 6/1937 | Hall | 426/286 |
| 2,092,090 | 9/1937 | Sharma | 426/253 |
| 2,374,210 | 4/1945 | Kalmar | 426/333 |
| 2,417,932 | 3/1947 | Kalmar | 426/253 |
| 2,420,322 | 5/1947 | Matorozza | 426/262 |
| 2,441,305 | 5/1948 | Wilson | 426/377 |
| 2,503,663 | 4/1950 | Geriche | 426/262 |
| 2,522,535 | 9/1950 | Pryor | 426/318 |
| 3,702,777 | 9/1963 | Bedrosian | 426/418 |

Primary Examiner—Norman Yudkoff
Assistant Examiner—Martin C. Mullen
Attorney, Agent, or Firm—Stefan M. Stein

[57] ABSTRACT

A composition and process for preserving vegetables, fruit, cut flowers and like produce through the prevention of discoloration and the maintenance of the produce in a fresh wholesome state. The produce, either in a whole or sliced condition, is subjected to a diluted aqueous solution including a preservative composition of sodium hypochlorite and a compound having the properties of high molecular weight and non-disassociation in water. Such compounds include alkali earth metal phosphates of sodium, lithium, potassium and cesium combined at predetermined concentrations dependent upon the produce being treated. The produce remains immersed in or subjected to the composition in aqueous solution for a period of time in the range of 0.5 to 30 minutes and subsequently rinsed with potable water and dried and stored at a substantially reduced temperature.

19 Claims, No Drawings

PRESERVATIVE PROCESS FOR PRODUCE USING A COMPOSITION COMPRISING SODIUM HYPOCHLORITE AND ALKALI EARTH METAL PHOSPHATES AND COMPOSITION

This application is a continuation-in-part application of my prior application Ser. No. 355,939, filed Apr. 30, 1973, now abandoned, which was a continuation-in-part application of my prior application Ser. No. 93,843, filed Nov. 30, 1970, now abandoned.

BACKGROUND OF THE INVENTION

1. Field of the Invention

This invention relates to a process and composition for treating produce through the application of a preservative aqueous solution to sliced or whole produce thereby extending the period of freshness of fruit, vegetables or cut flowers before discoloration and wilting occurs.

2. Description of the Prior Art

The produce industry, being quite aware of the problems associated with discoloration, wilting and other symptoms of spoilage, has attempted to maintain a fresh, appealing appearance of produce as long as possible. It is well-known that produce which has been pre-cut or sliced to facilitate packing, storage or sale is especially subject to early spoilage. The slicing of a vegetable or any sufficient break in the protective outer skin of a vegetable, fruit or flowers allows air to reach the inner portions of the produce thereby necessarily speeding up the aging process of the fruit and leading to early spoilage. None of the processes presently being used provides a satisfactory means of solving this problem of increased rate of spoilage because of direct exposure of the interior of the fruit to atmosphere. Consequently, the produce treating industry is constantly faced with unnecessarily high costs due to premature spoiling of produce.

The various methods which have been proposed to overcome the spoilage problem have been primarily directed to the improvement of the color of the produce, rather than maintaining freshness through an application of preservative process. These methods that are now used are generally designed to bleach the produce and provide a color additive. A number of these prior art methods are somewhat limited in that they have involved the use of acids and other strong chemicals which have a tendency to injure the material being treated or require very careful, critical control of the process to avoid damage to the produce. Such prior art methods are clearly unacceptable for preserving cut flowers.

The conventional bleaching methods used in the treatment of produce are designed to remove various stains present on the outer skin and to generally lighten the color of the produce to make it more appealing for sale. Many of these previously proposed bleaching methods, especially those involving the use of acid solutions, also tend to char or cause an undesirable reaction between the organic material and the acid constituent of the solution. Consequently, these prior art methods are often not applicable to the treatment of many types of produce and do not materially aid in extending the fresh life.

The use of oxidizing or reducing agents in providing certain color additives or to selectively bleach the produce is generally known in the art. Such oxidizing agents include hydrogen peroxide, sulfur dioxide and sodium-sulfon-paratoluene chloramine. Examples of reducing agents which may be used include copper sulfate, ferrous sulfate, ferrous sulfite, hydrogen sulfide, titaneous chloride and stannous chloride. Sodium hypochlorite is another popular oxidizing agent frequently used in prior art produce treatment processes. This compound is generally used in solutions of sufficient concentrations to cause a bleaching action to occur when the solution is applied to the produce being treated.

Prior art methods designed for the bleaching of produce utilize sodium hypochlorite as well as other additives such as hydrogen peroxide as disclosed in U.S. Pat. No. 2,092,090 to J. N. Sharma and U.S. Pat. No. 2,155,923 to J. A. Armstrong. As disclosed in these two patents, the concentration of sodium hypochlorite, or its equivalent oxidizing agent, is used only in concentrations sufficient to produce a bleaching action on the outer skins of fruits and vegetables. Sodium hypochlorite is not used as a preservative in these prior art methods.

A process employing chlorites for bleaching non-cellulosic organic materials is disclosed in U.S. Pat. No. 2,430,674 to C. A. Hampel. The use of sodium hypochlorite as a preservative is not suggested.

Additional United States patents show various preservative compositions and methods of preserving or maintaining the freshness and color of produce including fruit and vegetables. Such patents include: Hall — U.S. Pat. No. 2,082,573, Sharma — U.S. Pat. No. 2,092,090, Kalmar — U.S. Pat No. 2,374,210 and 2,417,930, Metarozzo — U.S. Pat. No. 2,420,322, Wilson — U.S. Pat. No. 2,441,305, Gericke — U.S. Pat. No. 2,503,663, Pyron — U.S. Pat. No. 2,522,535, and Bedrosian — U.S. Pat. No. 3,102,777. Again, while most of these prior art patents show a preservative product or process, they do not show the use of a composition which will react with the produce in an efficient manner having no deleterious effects on either taste, smell or appearance.

SUMMARY OF THE INVENTION

The present invention relates to a composition and process for preserving produce, especially vegetables and fruits, which have been sliced, or which remain in a whole condition, and cut flowers. This composition and process is primarily designed to considerably lengthen the time that the produce being treated remains fresh and appealing. More specifically, discoloration and wilting due to the exposure of the produce to atmosphere are considerably delayed through the interaction of the produce with the constituents of the composition. It is also advantageous in that produce which has been sliced or precut and those vegetables which have been inadvertently punctured so as to expose the interior thereof to atmosphere, may also be effeciently treated so as to considerably lengthen the time the treated produce remains fresh.

The process involved subjecting the produce to be treated with an aqueous solution of the preservative composition. Complete immersion for a predetermined period of time of the produce in a "bath" of the preservative solution while the bath is maintained at room temperature is preferred. This time range of immersion or exposure of the composition to the produce is approximately 0.5 to 30 minutes. Under normal conditions, 4 minutes of immersion are usually sufficient, of course, depending upon the concentration of composition used and the type of produce being treated. Care must be taken if an extended period at high concentrations is used because the produce may be "burned."

After subjecting the produce to the preservative solution, it is thoroughly rinsed with potable water so as to remove all residue of the bath from the produce. The treated produce is then dried by appropriate manner and stored at relatively low temperatures, generally in the range from 35° to 55°F.

Although an immersion-bath process is the most desirable, one could also utilize an appropriate spray device. For such, the produce would preferably pass under a plurality of spray heads using any conventional conveyor arrangement. Ideally, the unused solution passing through the conveyor is collected in a collection tank and the solution is recirculated back to the spray heads. When utilizing a spray device, the produce under treatment should not be maintained within the spray area for a period longer than approximately 30 minutes. However, as stated above, the maximum optimum period of exposure would be in the range of four minutes. After leaving the spray area, the treated produce is again rinsed with potable water, dried and stored at temperatures again in the range of between 35° to 55°F.

Storage of the treated produce at reduced temperatures thereafter serves to aid in the initial preservation process and further extends the life of the produce being treated. As is well known, heat tends to break down chemical structure of produce exposed to atmosphere. The combination of first subjecting the produce to preservative composition then storing the produce after treatment in a relatively cold environment therefore comprises an extremely efficient method for extending the fresh life of the produce. It reduces unnecessary cost due to waste and spoilage.

The produce for which this process is particularly applicable include, but is not limited to all types of, lettuce, asparagus, artichokes, beets, broccoli, green onions, spinach, apricots, grapes, plums, peaches, oranges, lemons, cherries, grapefruits, limes, melon, cauliflower, potatoes, cucumbers, brussel sprouts, radishes, snow peas, parsley, celery, mustard greens, chili peppers, corn, apples, pears, tomatoes, cherry tomatoes, anise, chard, bittermelon and bell peppers. Again, it is emphasized that all of the above vegetables can be treated in a precut or sliced condition as well as whole condition. Fruit and cut flowers also benefit from treatment in accord with the present invention.

The preservative composition of this invention comprises sodium hypochlorite and an alkali earth metal phosphate. By combining sodium hypochlorite with a compound having sufficient molecular weight to penetrate the plant's cells and having the characteristics of not disassociating in water, a synergistic preservative composition is produced. This composition serves to extend shelf life, and apparently causes a penetration of the cell walls accompanied by the familiar action of chlorine on the bacteria contained therein.

Sodium hypochlorite is combined with a "vehicle" having a high molecular weight and also being non-dissociative in water. Such compounds include alkali earth metal phosphates selected from a group consisting of sodium, lithium, potassium and cesium hexametaphosphates and sodium, lithium, potassium and cesium tetrametaphosphates. Specifically, and only for illustrative purposes, sodium hexametaphosphate is a colorless glass-like crystal which is soluble in cold water and which has a molecular weight of 611.17 grams. The generally accepted formula for sodium hexametaphosphate is $(NaPO_3)_6$, and it is commonly known as Graham's salt. As stated above, and again for illustrative purposes, it is possible to substitute the compound potassium tetrametaphosphate $(KPO_3)4.2H_2O$, having a molecular weight of 508.33 grams. In any event, in operation the surface and/or stem portions of the produce being treated are activated to the extend that the capillaries will receive the sodium hypochlorite due to the "vehicle" compound's penetrating the surface cells of the produce. The composition enters the surface of the produce and kills the subsurface bacteria and enzymes. After this reaction, the composition decomposes into chlorine and oxygen which passes through the surface to the atmosphere, thereby preventing accumulation of the compound in the produce being processed and eliminating any undesirable residue being left on the produce. Of course, the physical characteristics of the other feasible vehicle compounds, namely, lithium, potassium and cesium hexametaphosphate and sodium, lithium and cesium tetrametaphosphate, may be obtained from any standard reference of inorganic chemical compounds.

The invention accordingly comprises the several steps and the relation of one or more such steps with respect to each of the others thereof, which will be exemplified in the process hereinafter disclosed and the scope of the invention will be indicated in the claims.

For a fuller understanding of the nature of the objects of the invention, reference should be had to the following detailed description.

DETAILED DESCRIPTION

This process for produce, either in a presliced or whole condition, comprises exposing the produce to be treated for a predetermined time at a predetermined temperature to a dilute aqueous solution of the preservative composition. This composition comprises, by weight, 5–12% soldium hypochlorite, 0.001–2.0% vehicle and 86–94.999% water. Depending on the specific vegetables or produce being treated and the strength of the composition being used, the composition is added in varying amounts to predetermined quantities of fresh water (predetermined ounces of composition to predetermined gallons of water) maintained at room temperature. Ideally, the aqueous solution is prepared by adding ¼ to 20 ounces preservative composition to 18 gallons of water. The specific temperature at which the solution is maintained may be varied and has little practical effect over the outcome of the process as long as the temperature range of the bath is maintained between approximately 34° and 85°F.

An important element in this composition is the use, in combination with sodium hypochlorite, of a vehicle compound having sufficiently high molecular weight to penetrate the plant's cells and having the characteristics of not dissociating in water. These characteristics provide for a unique reaction between the composition and the produce being treated. As stated above, it is desirable to subject the produce to chlorine. In order to accomplish this, sodium hypochlorite is combined with a vehicle compound having the characteristics described above. Those physical properties of the vehicle account for the ability of the compound to puncture or enter the produce tissue so that the sodium hypochlorite may also enter. The vehicle activates the surface and stem of the produce so that the capillaries will receive the chlorine from the sodium hypochlorite. Accordingly, the sodium hypochlorite enters the surface of the produce and kills the subsurface bacteria and enzymes. The chemical then dissipates and decomposes into the gases chlorine and oxygen, which pass through the surace of the produce, thereby eliminating any accumulation in the produce of residues. Furthermore, the vehicle compound does not enter into a reaction with the produce; it merely attaches itself thereto. The entire preservative composition then becomes soluble. The vehicle will then detach itself from the produce once it is solubilized and become available to work on other produce.

One example of the preservative composition of this invention comprises, by weight, 10% sodium hypochlorite, 0.05% sodium hexametaphosphate and approximately 89.95% water. Also, a composition having one-half this strength (i.e., 5% sodium hypochlorite and 0.025% sodium hexametaphosphate) may be used. Under ideal conditions, a preservative bath is prepared by adding from 2 to 9 ounces of the preservative composition comprising 10% sodium hypochlorite, 0.05% sodium hexametaphosphate and 89.95% water to 2 to 18 gallons of fresh water, all at room temperature. The various concentrations of the preservative composition are dependent upon the produce being treated. Treatment of either presliced or whole produce comprises immersing the produce in the preservative bath for an optimum period of up to approximately 4 minutes. Subsequent to drying, the treated produce is stored at a reduced temperature in the range of 36° to 45°F. Ideally, dependent upon the particular produce being treated, the preferred storage temperature is 38°F.

As previously stated, the vehicle of the preservative composition may, in addition to sodium hexametaphosphate, comprise and of the alkali earth metal phosphates selected from the group consisting of lithium hexametaphosphate, potassium hexametaphosphate cesium hexametaphosphate, sodium tetrametaphosphate, lithium tetrametaphosphate, potassium tetrametaphosphate, and cesium tetrametaphosphate. In order to provide the same solubilization power as either of the above sodium salts, one could use the same amount of the corresponding lithium salt. However, the cost is nearly 10 times greater. The potassium salts cost three to four times as much as the sodium salts, and the amount (concentration) needed is about twice that of the sodium salts. The cost of the above cesium salts is also about 10 times more than the corresponding sodium salts, and the amount needed is 15 times greater. Thus, while each member of the above-defined group gives satisfactory results, sodium hexametaphosphate is the most economical.

It should also be noted that while pyrophosphate and phosphate salts may appear to provide the same vehicle function as the above hexametaphosphate and tetrametaphosphate salts, such salts accomplish their effect by saponification. That is, such salts break down oily materials from the produce being treated and form a soap. This reaction, unlike that of the hexametaphosphates and tetramethaphosphates, increases the toxicity of the system. Also once the reaction takes place, that amount of salt is removed from the system, and is, therefore, not available to work on other produce. For these reasons the pyrophosphate and phosphate salts are not suitable for use in treating produce in accord with this invention.

The same amount of the different concentrated compositions prepared utilizing the above-specified vehicles may be added to approximately the same amounts of water when the composition is applied to produce by spray means.

The following experimental procedures establish that the hypochlorite ion actually enters the plant tissue when applied in the presence of sodium hexametaphosphate or equivalent vehicle compound having sufficient molecular weight to penetrate the plant's cells and the characteristic of non-disassociation in water. The analysis was done on certain produce, and it is reasonable to assume that similar action occurs on other fruits, vegetables and cut flowers.

EXAMPLE I

Heads of lettuce are subjected to cleansing treatments of three types: (1) plain water wash, (2) hypochlorite wash and rinse, (3) hypochlorite with sodium hexametaphosphate wash and rinse.

On each head, the butt with 1 inch of core and the attached leaf, 1 inch from the core all around, is removed after the head has been wiped dry with a paper towel. Each core removed is then analyzed for chloride by maceration of the sample in water. The water is then washed with hexane to remove most of the coloring material, and the chloride is determined by siver nitrate titration.

The plain water washed lettuce is used as the reference standard to establish the normal level of chloride in the plant tissue. This is determined to be 36 parts per million with eight replications within 5 parts of that figure. The hypochlorite wash and rinse samples also show essentially the same quantity of chloride. The hypochlorite-sodium hexametaphosphate washed material is rinsed and dried as above. Analysis shows 66 parts per million chloride. The difference can only be attributed to hypochlorite entering the plant tissue and degenerating to the chloride.

EXAMPLE II

To determine the effect of sodium hypochlorite-sodium hexametaphosphate solution on the chloride content of vegetation the following procedure is employed:

The core is removed from each of the produce articles listed below, the vegetation is washed and dried and the sample is macerated in water. Nitric acid is added to free the chloride from plant tissue, and the entire solution is titrated potentiometrically with standard silver nitrate solution.

Sodium hexametaphosphate inhibits healing of the plant tissues, thus allowing the hypochlorite to enter the tissues. Apparently, the hypochlorite combines with the chloride of the plant and decomposes to chlorine gas and oxygen gas. Therefore, the higher the hypochlorite-sodium hexametaphosphate solution, the more chloride from the plant is combined with hypochlorite, and the lower the residual chloride.

| CHLORIDE ppm | Untreated | 2/oz/18 Gal | 5oz/18 Gal | 9oz/18 Gal |
|---|---|---|---|---|
| Green Onions | 793.2 | 641.9 | 512.8 | 459.6 |
| Green Peppers | 255.2 | 246.0 | 235.79 | 164.1 |
| Endive | 582.5 | 418.7 | 416.5 | 344.2 |
| Escrolo | 803.2 | 678.9 | 622.0 | 651.2 |
| Lettuce | 387.3 | 350.3 | 332.1 | 310.6 |

EXAMPLE III

An aqueous preservative solution is prepared by adding, by weight, 10% sodium hypochlorite, 0.05% sodium hexametaphosphate and 89.95% water. Eight ounces of this solution is added to 200 gallons of fresh water maintained at a room temperature between 34° and 85°F. The produce to be treated, comprising sliced carrots, is immersed in the prepared preservative bath for a period of between 1 to 2 minutes. The treated produce is then removed from the bath and thoroughly rinsed with potable water. Subsequently the sliced carrots are allowed to dry. After drying, the sliced carrots are stored at a temperature of approximately 38°F. At the end of a 14 day period, the carrots will exhibit a fresh, crisp, appealing appearance with no sign of wilting or discoloration.

EXAMPLE IV

An aqueous preservative solution is prepared by adding, by weight, 10% sodium hypochlorite, 0.05% sodium hexametaphosphate, and 89.95% water. Nine ounces of this solution is added to 18 gallons of fresh water maintained at a room temperature between 34° and 75°F. The produce to be treated comprising brussel sprouts is immersed in the prepared preservative bath for a period of between 2 to 4 minutes. The treated produce is then removed from the bath and thoroughly rinsed with potable water. After drying, the brussel sprouts are stored at a temperature of 40°F. At the end of a 14 day period, the brussel sprouts subjected to this process still maintain a fresh, crisp, appealing appearance with no sign of discoloration or wilting.

EXAMPLE V

An aqueous preservative solution is prepared by adding, by weight, 10% sodium hypochlorite, 0.05% sodium hexametaphosphate and 89.95% water. Two ounces of this solution is added to 18 gallons of fresh water maintained at room temperature between 34° and 75°F. The produce to be treated comprising artichockes is immersed in the prepared preservative bath for a period of between 2 to 4 minutes. The treated produce is then removed from the bath and thoroughly rinsed with potable water. After drying, the artichokes are stored at a temperature of 38° to 40°F. At the end of a 21 day period, the artichokes still maintain a fresh, crisp, and appealing appearance with no signs of discoloration or wilting.

EXAMPLE VI

An aqueous solution of the preservative composition is prepared by mixing, by weight, 10% sodium hypochlorite, 0.05% sodium hexametaphosphate, and 89.95% water. Nine ounces of this preservative solution is then added to 18 gallons of fresh water maintained at a temperature between 34° and 75°F. Produce comprising whole cherry tomatoes is then immersed in the preservative bath for a period of 4 minutes and removed. The cherry tomatoes are then thoroughly rinsed with potable water and allowed to dry. After drying, the cherry tomatoes are stored at a temperature of 40°F. At the end of the 14 day period, the cherry tomatoes subjected to this process still maintain a fresh, firm and appealing appearance with no sign of discoloration or wilting.

In addition to the above, the following produce may be treated with the indicated amount in ounces of composition comprising 89.95% water by weight, 10% sodium hypochlorite by weight and 0.05% sodium hexametaphosphate by weight:

| | |
|---|---|
| Grapes | 2 oz to 18 gallons stored at 38° to 40°F. |
| Plums | 2 oz to 18 gallons stored at 38° to 40°F. |
| Cherries | 2 oz to 18 gallons stored at 38° to 40°F. |
| Bell Peppers | 9 oz to 18 gallons stored at 38° to 40°F. |
| Corn | 9 oz to 18 gallons stored at 38° to 40°F. |
| Mustard Greens | 9 oz to 18 gallons stored at 38° to 40°F. |

It will thus be seen that the objects made apparent from the preceeding description, are effeciently attained and, since cetain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Now that the invention has been described, what is claimed is:

1. A process for preserving whole and sliced produce comprising:
  a. forming a composition including, by weight, 5–12% sodium hypochlorite, 0.001–2% by weight a vehicle having high molecular weight selected from the group consisting of sodium hexametaphosphate, lithium hexametaphosphate, potassium hexamtaphosphate, cesium hexametaphosphate, sodium tetrametaphosphate, lithium tetrametaphosphate, potassium tetrametaphosphate, and cesium tetrametaphosphate, and 86–94.999% water;
  b. forming a bath by adding said formed composition to about 1 to 200 gallons of water, dependent upon the type of produce being treated;
  c. subjecting said produce to said bath for a period of time from 0.5 to 30 minutes; and
  d. subsequently rinsing said produce with potable water.

2. The process of claim 1 further comprising: adding between 2 and 9 oz. of said composition to said water, and forming said bath to comprise approximately 18 gallons of water.

3. The process of claim 1 further comrpising: adding 2 oz. of said composition to said water and forming said bath to include approximately 18 gallons of water.

4. The process of claim 1 further comprising: adding 9 oz. of said composition to said water and forming said bath to include approximately 18 gallons of water.

5. The process of claim 1 wherein said composition is formed to include, by weight, 5% sodium hypochlorite, 0.025% sodium hexametaphosphate and 94.975% of water.

6. The process of claim 1 wherein said composition is formed to include, by weight, 10% sodium hypochlorite, 0.05% potassium tetrametaphosphate, and 89.95% of water.

7. The process of claim 1 further comprising: drying said treated produce subsequent to rinsing and subjecting said produce to a reduced temperature subsequent to drying.

8. The process of claim 7 further comprising: subjecting said treated produce to an atmosphere maintained at a reduced temperature range of between 36° to 45°F. subsequent to drying.

9. The process of claim 7 further comprising subjecting said treated produce to an atmosphere maintained at a reduced temperature of approximately 40°F. subsequent to drying.

10. The process of claim 1 further comprising subjecting said produce to said bath for a period of time less than approximately 2 minutes.

11. The process of claim 1 further comprising subjecting said produce to said bath for a period of time less than 4 minutes.

12. A produce preservative solution comprising:
   a. one quarter to 20 ounces of a concentrate comprising 5–12% by weight sodium hypochlorite, 0.001–2% by weight a vehicle having high molecular weight and being non-dissociative in water selected from the group consisting of sodium hexametaphosphate, lithium hexametaphosphate, potassium hexametaphosphate, cesium hexametaphosphate, sodium tetrametaphosphate, lithium tetrametaphosphate, potassium tetrametaphosphate and cesium tetrametaphosphate, and 86–94.999% by weight water; and
   b. 1 to 200 gallons water.

13. A solution as in claim 12 comprising 2 ounces of said concentrate and 18 gallons of said water.

14. A solution as in claim 12 comrpising 9 ounces of said concentrate and 18 gallons of said water.

15. A concentrate composition for a produce preservative solution, said composition comprising:
   a. 5–12% by weight sodium hypochlorite;
   b. 0.001–2% by weight a vehicle having high molecular weight selected from the group consisting of sodium hexametaphosphate, lithium hexametaphospahte, potassium hexametaphosphate, cesium hexametaphosphate, sodium tetrametaphosphate, lithium tetrametaphosphate, potassium tetrametaphosphate, and cesium tetrametaphosphate; and
   c. 86–94.999% weight water; to total 100%.

16. A composition as in claim 15 wherein said sodium hypochlorite comprises 5% by weight, said vehicle comprises 0.025% by weight, and said water comprises 94.975% by weight.

17. A composition as in claim 15 wherein said sodium hypochlorite comprises 10% by weight, said vehicle comprises 0.05% by weight, and said water comprises 89.95% by weight.

18. A composition as in claim 15 wherein said sodium hypochlorite comprises 5% by weight, said vehicle comprises 0.025% by weight sodium hexametaphosphate, and said water comprises 94.975% by weight.

19. A composition as in claim 15 wherein said sodium hypochlorite comprises 10% by weight potassium tetrametaphosphate, and said water comprises 89.95% by weight.

* * * * *

UNITED STATES PATENT AND TRADEMARK OFFICE
CERTIFICATE OF CORRECTION

PATENT NO. : 3,978,235
DATED : August 31, 1976
INVENTOR(S) : Phillip Schiro

It is certified that error appears in the above-identified patent and that said Letters Patent are hereby corrected as shown below:

Column 10, line 36 - after weight, insert --, said vehicle comprises 0.05% by weight --

Signed and Sealed this

Twenty-sixth Day of October 1976

[SEAL]

Attest:

RUTH C. MASON
*Attesting Officer*

C. MARSHALL DANN
*Commissioner of Patents and Trademarks*